(12) United States Patent
Yamamura

(10) Patent No.: US 6,363,812 B1
(45) Date of Patent: Apr. 2, 2002

(54) MOUNTAIN STRAP FOR A SNOWMOBILE

(75) Inventor: Takashi Yamamura, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/507,015

(22) Filed: Feb. 22, 2000

(30) Foreign Application Priority Data

Feb. 19, 1999 (JP) .......................................... 11-041295

(51) Int. Cl.[7] .................................................. B62D 1/22
(52) U.S. Cl. ...................................... 74/551.8; 180/319
(58) Field of Search ............................ 74/551.8, 551.1, 74/479.01, 488, 551.9; 180/319, 320, 332, 335, 78, 190, 191, 192, 193; D12/178; 150/167, 168; 280/288.4; 296/78.1

(56) References Cited

U.S. PATENT DOCUMENTS

| | | | |
|---|---|---|---|
| 1,448,921 A | * 3/1923 | Ershkowitz | ................. 74/551.8 |
| 4,619,341 A | 10/1986 | Davis | |
| 5,064,157 A | 11/1991 | O'Neal | |
| 5,239,884 A | 8/1993 | Norsen | |
| 5,282,502 A | * 2/1994 | Ballard | ......................... 150/167 |
| 5,562,139 A | * 10/1996 | Cseri | ........................... 150/167 |

FOREIGN PATENT DOCUMENTS

| | | | |
|---|---|---|---|
| DE | 2916437 | * 11/1980 | ................. 74/551.1 |
| GB | 10844 | * of 1895 | ................. 74/551.1 |

* cited by examiner

*Primary Examiner*—Mary Ann Green
(74) *Attorney, Agent, or Firm*—Knobbe, Martens, Olson & Bear, LLP

(57) ABSTRACT

A snowmobile includes a mountain strap for allowing a rider to shift his or her weight on the snowmobile to a greater degree in order to improve the handling characteristics of the snowmobile when traversing steep terrain or turning tightly at elevated speeds. The snowmobile includes a steering assembly and a handlebar connected to the steering assembly. The handlebar includes a central mounting portion, upright portions extending generally upwardly from each side of the central mounting portion, grip portions extending generally outwardly from the upright portions, and curved portions formed between the upright portions and grip portions. A mountain strap is provided comprising a core member having first and second ends which extend around the handlebar and are connected to the core member to form loop portions. The loop portions are positioned at the curved portions of the handlebar.

20 Claims, 4 Drawing Sheets

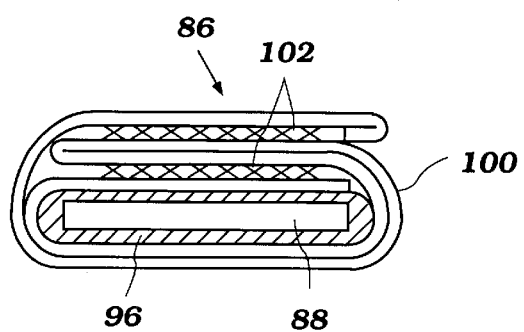
Figure 3
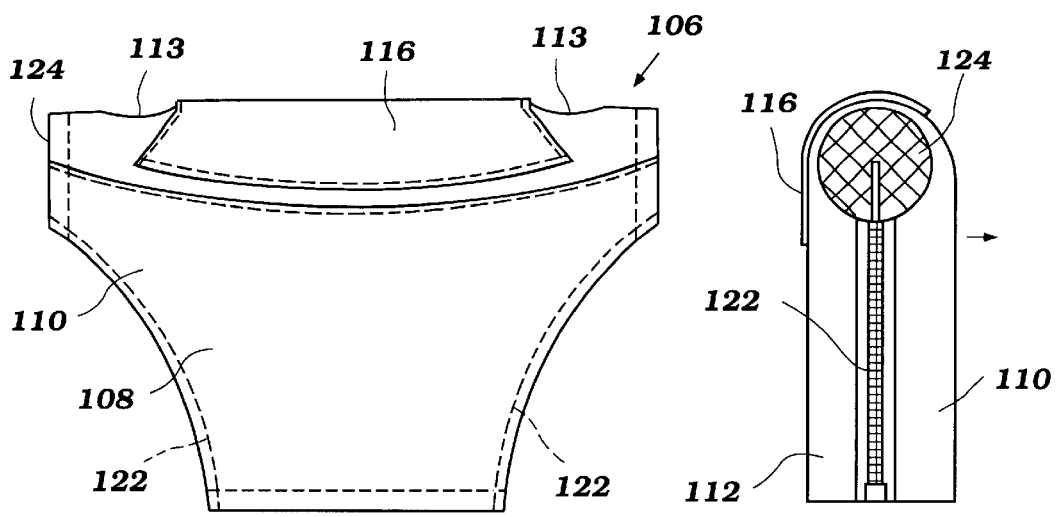
Figure 6          Figure 7

MOUNTAIN STRAP FOR A SNOWMOBILE

PRIORITY INFORMATION

This application is based on and claims priority to Japanese Patent Application No. 11-041295, filed Feb. 19, 1999.

BACKGROUND OF THE INVENTION

1. Field of the Invention

The present invention relates to snowmobiles and, more particularly, to handlebar assemblies for snowmobiles.

2. Description of the Related Art

Snowmobiles are often operated at high speeds and over rough terrain. In such conditions, it is especially important that a rider be able to maintain effective control of the snowmobile.

When the rider of the snowmobile is traversing an incline, or making a high-speed turn, it is desirable for the rider to shift his weight on the snowmobile to lean uphill or into the turn as much as possible while maintaining effective control over the snowmobile. To that end, grab-handles of various types have been devised that allow the rider to remove the downhill or outside hand from the handlebar of the snowmobile in order to shift his weight as much as possible uphill or into the turn.

The grab-handles are typically attached to the handlebar of the snowmobile by metal clamps, which may scratch or otherwise damage the handlebar. In addition, such grab bars are typically comprised of several different parts, and thus are relatively costly to manufacture. Furthermore, the grab bars themselves are often unsightly.

SUMMARY OF THE INVENTION

The grip or mountain strap of the present invention provides a secure and comfortable grip for allowing the rider to shift his or her weight on the snowmobile to a greater degree in order to improve the handling characteristics of the snowmobile when traversing steep terrain or turning tightly at elevated speeds. The mountain strap is connected to the handlebar of the snowmobile without clamps or other fixtures, thus avoiding scratches and other damage to the handlebar. Furthermore, because no clamps or other fixtures are required, the number of parts is reduced and the manufacturing cost of the mountain strap is minimized.

Accordingly, one aspect of the present invention involves a snowmobile comprising a steering assembly and a handlebar connected to the steering assembly. The handlebar includes a central mounting portion, upright portions extending generally upwardly from each side of the central mounting portion, grip portions extending generally outwardly from the upright portions, and curved portions formed between the upright portions and grip portions. A grip or mountain strap is provided comprising a core member having first and second ends with respective first and second loop portions. The loop portions are positioned at the curved portions of the handlebar. The mountain or grip strap can also be used with a variety of other vehicles as well which employ a similar handlebar assembly.

In one mode, the snowmobile also includes a handlebar pad which substantially covers the central mounting portion, the upright portions, and the curved portions of the handlebar. The handlebar pad has openings provided therein for passage of the first and second ends of said mountain strap.

Another aspect of the present invention involves a kit comprising a grip strap for use with a handlebar assembly of a vehicle. The grip strap comprises a core member having unitary first and second loop portions that are sized to snugly fit onto the handlebar assembly. A grip cover covers at least a portion of the strap. In a preferred mode, the kit also includes a handlebar pad for use with the handlebar assembly. The handlebar pad is configured to cover at least a portion of the handlebar assembly and includes a pair of openings. Each opening is sized to receive a section of the grip strap.

Further aspects, features and advantages of this invention will become apparent from the detailed description of the preferred embodiment that follows.

BRIEF DESCRIPTION OF THE DRAWINGS

These and other features, aspects and advantages of the present invention will now be described with reference to the drawings of a preferred embodiment, which embodiment is intended to illustrate and not to limit the present invention, and of which:

FIG. 3 is a cross-sectional view of the mountain strap of the snowmobile of FIG. 1, taken along the line 3—3 of FIG. 2;

FIG. 6 is a front elevational view of the handlebar pad of the snowmobile of FIG. 1; and FIG. 7 is a right side elevational view of the handlebar pad of the snowmobile of FIG. 1.

DETAILED DESCRIPTION OF THE PREFERRED EMBODIMENT

Figure 1:
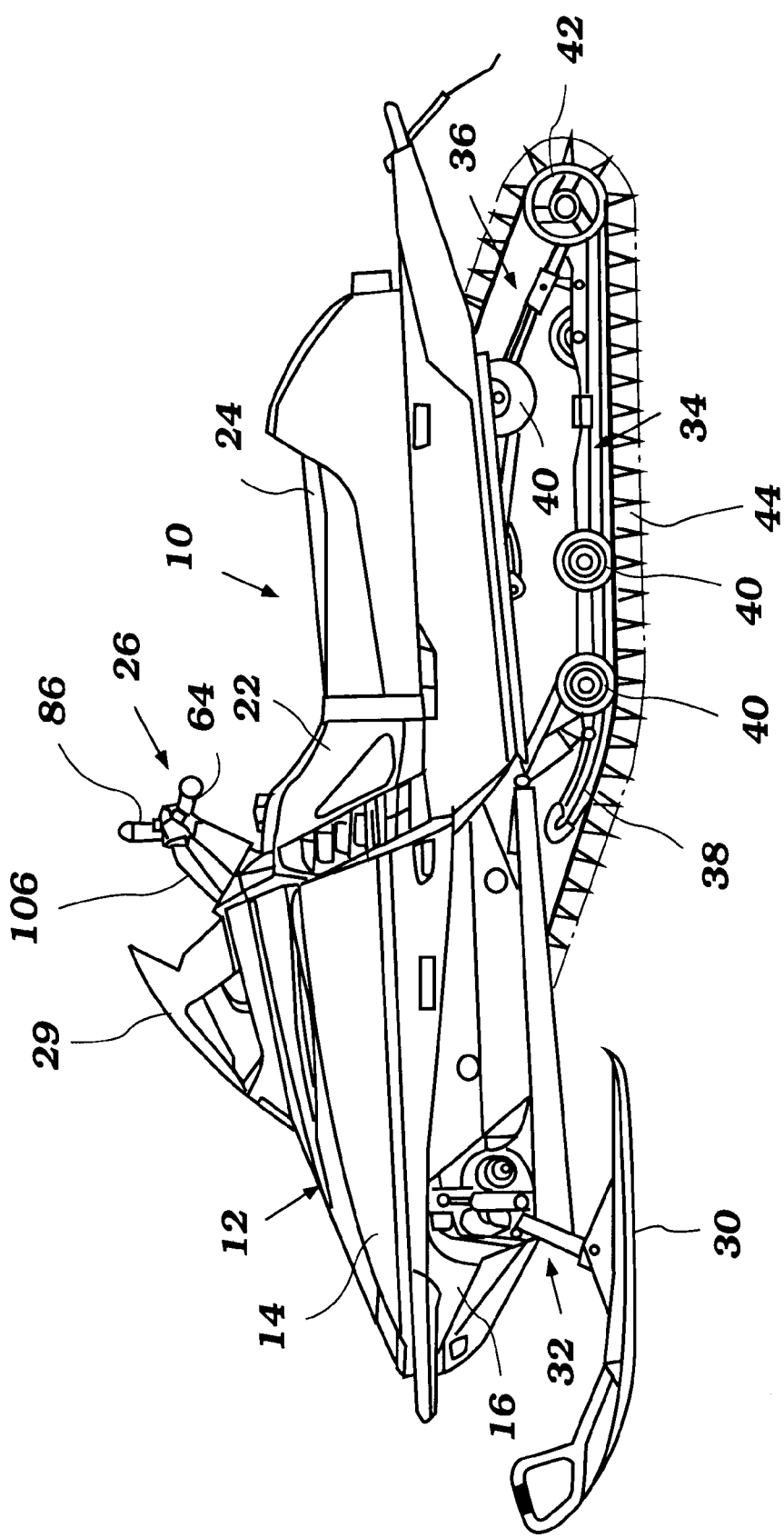
FIG. 1 is a left side elevational view of a snowmobile including a mountain strap and handlebar pad in accordance with a preferred embodiment of the present invention.

With reference initially to FIG. 1, a snowmobile constructed in accordance with a preferred embodiment of the present invention is identified generally by the reference numeral 10. The snowmobile 10 includes a body assembly 12 made up of a number of parts which may be formed from suitable materials. The body assembly 12 includes an upper engine shroud 14 and a lower tray 16, which together define an engine compartment. The engine compartment houses an internal combustion engine (not shown) for powering the snowmobile 10.

The body assembly 12 further includes a rear portion 22 that accommodates a seat 24 adapted to seat one or more riders in a straddle fashion. A handlebar assembly 26 is positioned in front of the seat 24 for operation by the rider.

A windshield 29 is provided on the upper engine shroud 14 in front of the handlebar assembly 26. The windshield 29 provides protection to the rider from wind, snow, branches and other objects when operating the snowmobile 10.

A pair of front skis 30 are supported at a forward portion of the body 12 by means of a front suspension system 32. The handlebar assembly 26 is linked to the front skis 30 via a steering assembly of the snowmobile 10, such that movement of the handlebar 26 results in a corresponding steering movement of the front skies 30, as is well known in the art.

A carriage assembly 34 is supported at the rear portion 22 of the body 12 below the seat 24 by a rear suspension system 36. The carriage assembly 34 includes a pair of guide rails 38 that carry a plurality of idler rollers 40, including a main rear idler roller 42.

The guide rails 38 and idler rollers 40, 42 cooperate to form a path around which a drive track 44 is trained. The drive track 44 is driven by an output shaft (not shown) of the engine through a suitable variable belt-type transmission, as is well known in the art.

Figure 2:
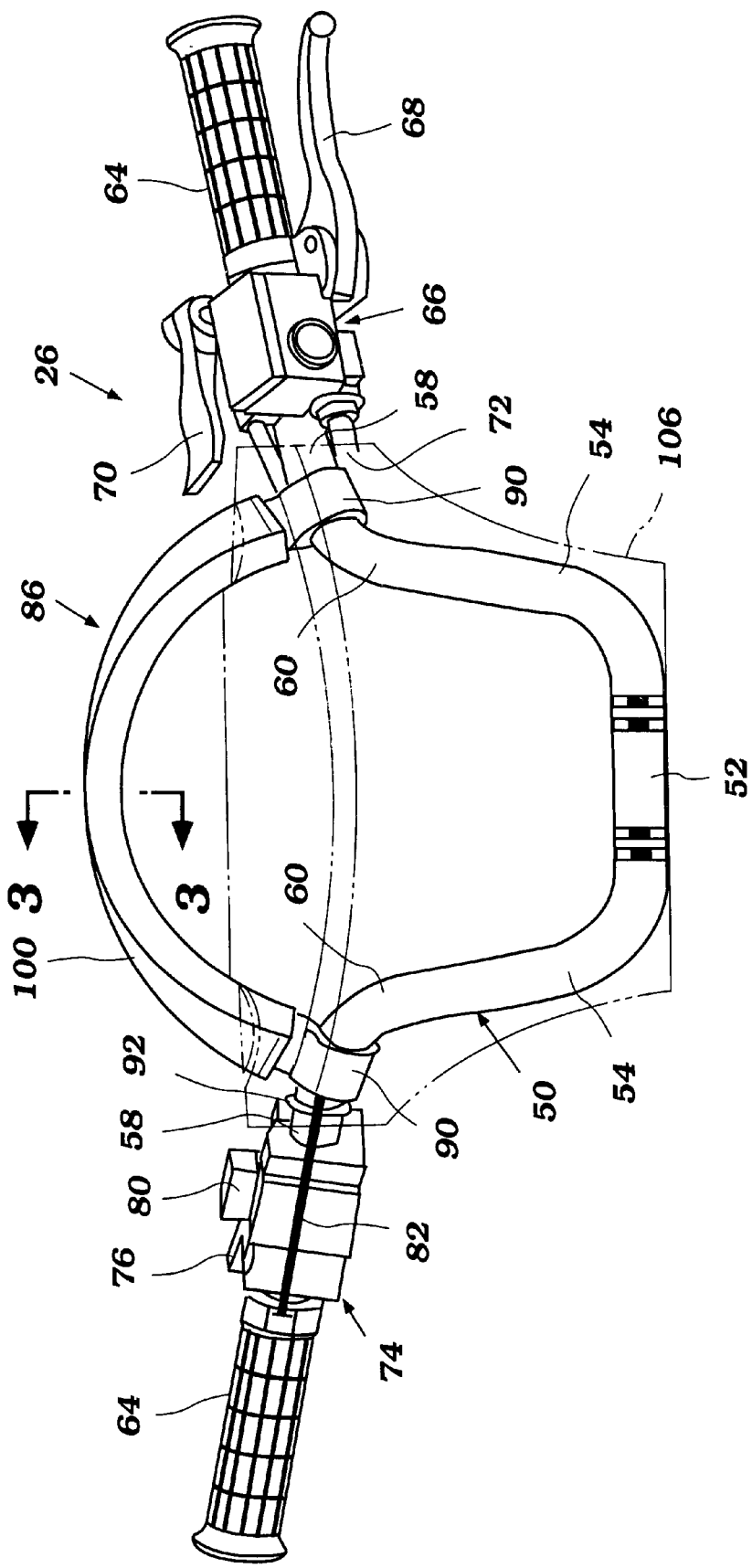
FIG. 2 is a front elevational view of the handlebar assembly, mountain strap, and handlebar pad of the snowmobile of FIG. 1, with the handlebar pad illustrated in phantom.
Figure 4:
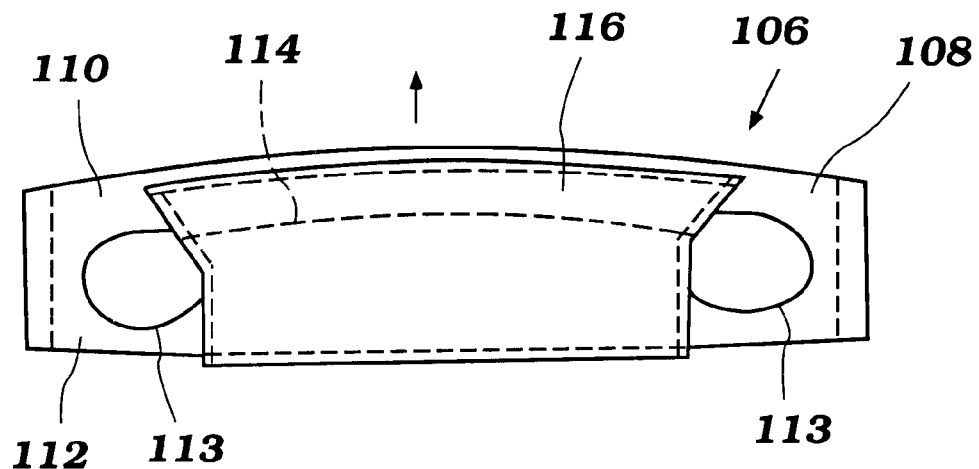
FIG. 4 is a top plan view of the handlebar pad of the snowmobile of FIG. 1.
Figure 5:
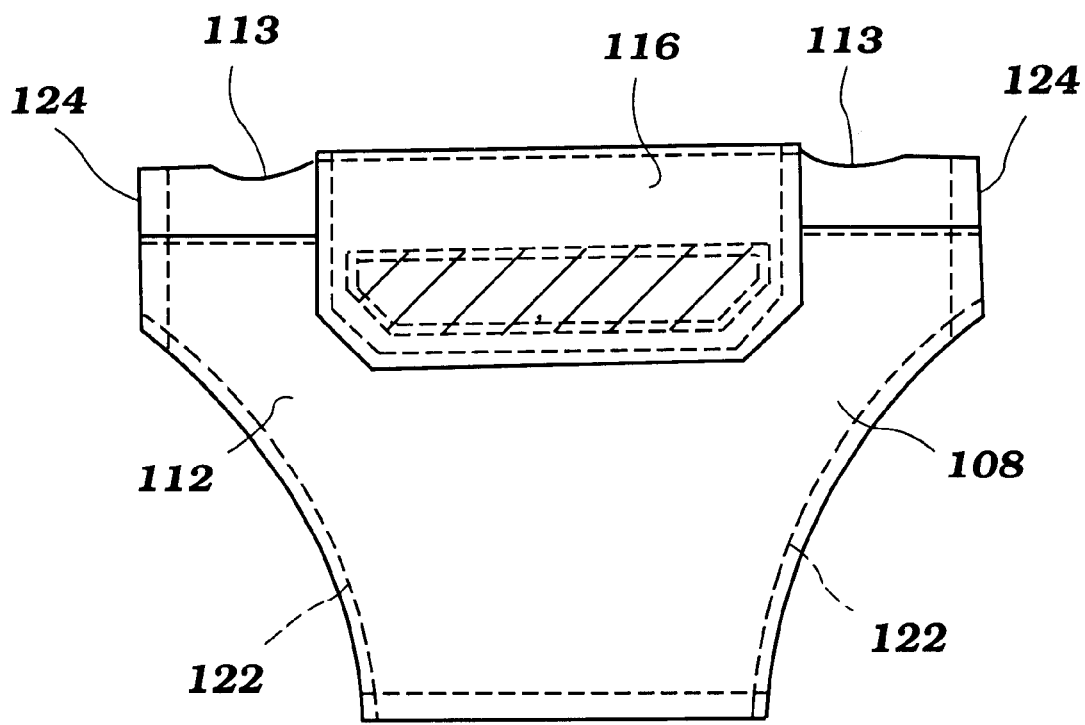
FIG. 5 is a rear elevational view of the handlebar pad of the snowmobile of FIG. 1.

With reference now to FIG. 2, in the illustrated embodiment, the handlebar assembly 26 includes a handlebar 50 having various components mounted thereon. The handlebar 50 is preferably formed from steel or aluminum tubing having a circular cross-section. The handlebar 50 has a central mounting portion 52 for mounting to a steering assembly of the snowmobile 10. The handlebar 50 bends upwardly at each side of the central mounting portion 52 to form upright portions 54. From the upright portions 54, the handlebar 50 bends outwardly to form grip portions 58. A curved portion 60 is formed at the transition between each upright portion 54 and grip portion 58.

In the illustrated embodiment, hand grips 64 are provided over the grip portions 58 of the handlebar 50. A brake control assembly 66 is mounted at the interior side of the left hand grip 64, as is conventional, for controlling a braking system of the snowmobile 10. The brake control assembly 66 includes a hand brake lever 68 which extends over the front of the left hand grip 64 for operation by the left hand of the rider.

In the illustrated embodiment, the brake control assembly 66 further includes a parking brake lever 70, and a brake cable 72 extending from the brake control assembly 66 for communication with the braking system.

A throttle control assembly 74 is mounted on the right grip portion 58 of the handlebar 50 at the interior side of the right hand grip 64, as is also conventional. The throttle control assembly 74 includes a throttle lever 76 which extends toward the right hand grip 64 on the rearward side of the handlebar 50 for operation by the right thumb of the rider. A kill switch 80 is also provided for shutting off the engine. In the illustrated embodiment, the hand grips 64 are heated by electrical resistance wires which are connected to an electrical system of the snowmobile 10 via one or more lead wires 82.

In accordance with a preferred embodiment of the present invention, a mountain strap 86 is provided on the handlebar 50 of the snowmobile 10, as illustrated in FIG. 2. The mountain strap 86 includes a core member 88. The core member 88 preferably comprises a strong, flexible, material such as a woven nylon fabric; however, other suitable materials can also be used.

As illustrated in FIG. 2, the ends of the core member 88 are wrapped around the handlebar 50 and are connected to the core member 88 to form loop portions 90. Depending on the type material from which the core member 88 is fabricated, connection of the ends may be made by sewing, riveting, or adhering the two sections of the core member together, or by other means, such as, for example, by weaving the loop portions 90 into the material. In addition or in the alternative, various releasable attachment devices may be used, such as hook-and-pile fasteners, clamps, buckles, or any combination thereof. Regardless of how the loop portions 90 are formed, the loops are integrally formed with the core member 88, i.e., formed as a single unit.

Preferably, the loop portions 90 are situated at the curved portions 60 of handlebar 50 and fit snugly around the handlebar 50 to inhibit sliding movement of the loop portions 90. That is, the loop portions 90 are sized to have an inner diameter that just slips over the tubular handlebar 50. In addition, the loop portions 90 each have a width, which is sized relative to the radius of curvature of the corresponding curved portion 60, so as to inhibit the loop portions 90 from sliding around the curved portion 60 and down the handlebar toward the central mounting portion 52 of the handlebar 50.

A stopper 92 may be provided on the handlebar 50 adjacent one or both of the loop portions 90 to further inhibit sliding of the loop portions 90. In the illustrated embodiment, a single stopper 92 is provided on the handlebar 50 at the outside of the right loop portion 90 between the loop portion 90 and the throttle control assembly 74. It is to be understood, however, that additional stoppers 92 may be provided, and may be located on either side of either loop portion 90.

FIG. 3 is a cross-sectional view of the mountain strap 86 taken along the line 3—3 on FIG. 2. In the particularly preferred embodiment shown in FIG. 3, the core member 88 is coated with vinyl chloride resin 96; however, other suitable coatings can also be used. In general, the coating 96 serves to stiffen the mountain strap 86 and to provide the rider a more comfortable grip when grasping the mountain strap 86.

In the preferred embodiment shown in FIGS. 2 and 3, a cover member 100 is also provided over the core member 88. The cover member 100 can be fabricated from any number suitable materials (e.g., neoprene, leather, fabric, vinyl and the like), giving due consideration to the goal of providing the rider of the snowmobile 10 a secure and comfortable grip of the mountain strap 86. The cover member is wrapped around the core member 88 and secured with a hook-and-pile fastener 102.

When the rider of the snowmobile 10 is traversing an incline with the left side of the snowmobile facing downhill, or making a high-speed right turn, the rider can grab hold of the mountain strap 86 with the rider's left hand while continuing to hold onto the right hand grip 64 and operate the throttle lever 76 with the right hand. This allows the rider to lean further uphill or into the turn and thus shift the center of gravity of the snowmobile/rider in a desired direction to improve the handling characteristics of the snowmobile 10. Similarly, when the rider is traversing an incline with the right side of the snowmobile facing downhill, or making a high-speed left turn, the rider can grab hold of the mountain strap 86 with the right hand while continuing to hold onto the left hand grip 64. Of course, in this case the rider would be unable to operate the throttle lever 76.

The mountain strap 86 of the present invention thus provides a secure and comfortable grip for allowing the rider to shift his or her weight on the snowmobile to a greater degree in order to improve the handling characteristics of the snowmobile when traversing steep terrain or turning tightly at elevated speeds. Because the mountain strap 86 is not attached to the handlebar 50 with clamps or other fixtures, scratches and other damage to the handlebar 50 is avoided. Furthermore, because no clamps or other fixtures are required, the number of parts is reduced and the manufacturing cost of the mountain strap 86 is minimized.

A handlebar pad 106 is provided over the handlebar 50, as shown in FIG. 2. In the illustrated embodiment, the handlebar pad 106 includes a covering 108 which may be filled with a padding material, such as urethane foam. The covering 108 may be made from vinyl or other suitable material.

With reference now to FIGS. 4—7, in the illustrated embodiment, the handlebar pad 106 is comprised of a front portion 110 and a rear portion 112 connected at the top of the handlebar pad 106 by the covering 108. A pair of openings 110 are formed in the top of the handlebar pad 106. A slit 114 is formed in the covering 108 between the two openings 110. A cover flap 116 extends over the top of the slit 114 between the openings 110 from the front portion 110 to the rear portion 112.

The cover flap 116 is preferably fastened to the rear portion 112 of the handlebar pad with a releasable hook-and-pile fastener. In the illustrated embodiment, a zipper 122 is provided between the front and rear portions 110, 112 on each side of the handlebar pad 106 for releasably fastening the front and rear portions 110, 112, as best shown in FIG. 7. Each of the zippers 122 terminates at a handlebar opening 124 formed between the front and rear portions 110, 112 near the top of the handlebar pad 106.

To install the handlebar pad 106, the zippers 122 are unzipped and the handlebar pad 106 is unfolded. The cover flap 116 is removed from the rear portion 112 to expose the slit 114 formed between the openings 110 in the covering 108. The unfolded handlebar pad 106 is lowered over the handlebar 50 of the snowmobile 10 with the front portion 110 on the forward side of the handlebar 50, and the rear portion 112 on the rearward side. The handlebar pad 106 is placed over the mountain strap 86 so that the top or center portion of the mountain strap 86 extends through the slit 114. The ends of the mountain strap 86 extend through the openings 110 in the covering 108 of the handlebar pad 106.

The handlebar pad 106 is folded over the handlebar 50 so that the front and rear portions of the handlebar pad 106 cover the central mounting portion 52, upright portions 54, and curved portions 60 of the handlebar. The grip portions 58 of the handlebar 50 extend through the handlebar openings 124 formed at the sides of the handlebar pad 106. The zippers 122 are then zipped to fasten together the front and rear portions 110, 112 of the handlebar pad 106, and to secure the handlebar pad 106 to the handlebar 50. The cover flap 116 is reattached to the rear portion 112 of the handlebar pad 106 so that it extends under the center portion of the mountain strap 86 to cover the slit 114. The handlebar pad 106 covers the ends of the mountain strap 86 and a substantial portion of the handlebar 50 to provide a more pleasing appearance of the handlebar assembly 26.

Although this invention has been described in terms of certain preferred embodiments, other embodiments apparent to those of ordinary skill in the art are also within the scope of this invention. For example, the above described the present grip strap in combination with a snowmobile because the present grip strap has particular applicability with a snowmobile. This environment of use, however, was exemplary, and the present grip strap can be used with other types of vehicles as well, such as, for example, but not limited to, personal watercrafts and all terrain vehicles. Accordingly, the scope of the invention is intended to be defined only by the claims that follow.

What is claim is:

1. A snowmobile comprising a steering assembly, a handlebar connected to said steering assembly, said handlebar having a central mounting portion, upright portions extending generally upwardly from each side of said central mounting portion, grip portions extending generally outwardly from said upright portions, and curved portions formed between said upright portions and said grip portions, and a mountain strap connected to said handlebar, said mountain strap comprising a core member having first and second ends with respective first and second loop portions, each of said loop portions positioned generally at the respective curved portion of said handlebar.

2. The snowmobile of claim 1, wherein each loop portion is located on an upper section of the respective curved portion next to the corresponding grip portion.

3. The snowmobile of claim 2, wherein each of said grip portions has a generally cylindrical shape, and each of said loop portions defines a generally cylindrical opening of a diameter slightly larger than a diameter of an associated one of said grip portions so as to fit tightly thereon.

4. The snowmobile of claim 3, wherein each of said loop portions has a width and each of said curved portions of said handlebar has a radius of curvature, and the widths of the loop portions and the radii of curvature of the curved portions are sized so as to inhibit the loop portions from sliding downward, over the curved portions.

5. The snowmobile of claim 1, wherein the core member is comprised of a flexible material.

6. The snowmobile of claim 5, wherein the core material is comprised of a woven nylon fiber strap.

7. The snowmobile of claim 6, wherein the core material is further comprised of a coating over at least a portion of the nylon fiber strap.

8. The snowmobile of claim 7, wherein the coated portion of the nylon fiber is stiffer than uncoated woven nylon fiber.

9. The snowmobile of claim 7, wherein said coating is a vinyl chloride resin.

10. The snowmobile of claim 1, wherein each loop portion is formed by a respective end of the core member extending around said handlebar and being connected to said core member.

11. The snowmobile of claim 1, wherein said mountain strap further comprises a cover member provided over said core member.

12. The snowmobile of claim 1, further comprising one or more stoppers located on said handlebar adjacent said loop portions.

13. The snowmobile of claim 1, further comprising a handlebar pad, said handlebar pad substantially covering said central mounting portion, said upright portions, and said curved portions of said handlebar, and having openings provided therein for passage of said first and second ends of said mountain strap.

14. A kit comprising a grip strap and a handlebar pad for use with a handlebar assembly of a vehicle, the grip strap comprising a core member having unitary first and second loop portions being sized to snugly fit onto the handlebar assembly, and a grip cover covering at least a portion of the strap, and the handlebar pad configured to cover at least a portion of the handlebar assembly and including a pair of openings, each opening being sized to receive a section of the grip strap.

15. The kit of claim 14, wherein the core member is comprised of a strong, flexible material.

16. The kit of claim 15, wherein the core material is comprised of a woven nylon fiber strap.

17. The kit of claim 16, wherein the core material is further comprised of a coating over at least a portion of the nylon fiber strap.

18. The kit of claim 17, wherein the coated portion of the nylon fiber is stiffer than uncoated woven nylon fiber.

19. The kit of claim 17, wherein said coating is a vinyl chloride resin.

20. The kit of claim 14, wherein each loop portion is formed by a respective end of the core member being folded over and connected to said core member.

* * * * *